Patented Oct. 10, 1933

1,930,069

UNITED STATES PATENT OFFICE 1,930,069

PLASTIC MATERIAL CONTAINING DERIVATIVES OF CELLULOSE

James F. Walsh, South Orange, and Amerigo F. Caprio, Newark, N. J., assignors to Celluloid Corporation, a corporation of New Jersey No Drawing. Application July 24, 1930
Serial No. 470,532

6 Claims. (Cl. 106—40)

This invention relates to plastic materials containing organic derivatives of cellulose and plasticizers and relates more particularly to the overcoming or reducing of the tendency of plasticizer to exude from such plastic materials.

An object of our invention is to prevent or diminish the exudation of plasticizers from plastic materials containing organic derivatives of cellulose and such plasticizers. Another object of our invention is to incorporate certain synthetic resins in plastic compositions containing cellulose acetate to prevent or diminish the exudation of plasticizers contained therein. Further objects of our invention will appear from the following detailed description.

In making cellulose acetate plastics, either in sheet or film form, constant trouble has been experienced owing to the tendency of plasticizers to separate or exude on the surface. For example if 50 parts of a plasticizer such as para-ethyl-toluene-sulfonamid is used as a plasticizer to 100 parts of cellulose acetate, the seasoned sheets or films begin to exhibit a decided crystalline exudation on the surface after a month or so. We have found that the surfaces of cellulose acetate plastic sheets do not retain indefinitely the high polish characteristic of plastic sheets made of pyroxylin or cellulose nitrate. A greasy, oily or crystalline layer eventually forms on the surface and this mars the original crystal-clear appearance of the original sheets and renders the same unsaleable. Moreover the exudation is not readily apparent immediately after the manufacture of the sheets. This adds to the difficulty, since after a month or so (in some cases 6 months are required), the sheets begin to show this defect. Since exudation often occurs after such sheets are sold, they are returned to the manufacturer although they were satisfactory when they were shipped.

To illustrate the difference between plastics made of cellulose nitrate or pyroxylin and of cellulose acetate, in the case of pyroxylin plastics over 100 parts of tricresyl phosphate to 100 parts of pyroxylin may be employed without occurrence of oiliness or exudation. In the case of cellulose acetate plastics, a proportion as low as 20 parts of tricresyl phosphate to 100 parts of cellulose acetate will eventually cause an oily exudation. In other words cellulose acetate exhibits a poor retentive power for plasticizers or vice versa.

We have found that if a relatively small proportion of certain synthetic resins is incorporated in the plastic composition containing the organic derivative of cellulose and plasticizer, the tendency of the plasticizer to exude is obviated or at least greatly diminished.

In accordance with our invention, we diminish the tendency of exudation of the plasticizers from plastic materials containing organic derivatives of cellulose and plasticizers by incorporating therein a relatively small proportion of a suitable resin, such as synthetic resin.

While this invention will be described specifically in connection with plastics containing cellulose acetate, it is applicable to plastics containing other organic derivatives of cellulose such as cellulose formate, cellulose propionate and cellulose butyrate or cellulose ethers such as ethyl cellulose, methyl cellulose and benzyl cellulose.

The plastic composition contains, besides the cellulose acetate, suitable plasticizers such as para-ethyl-toluene-sulfonamid, mono-methyl-xylene-sulfonamid, triacetin, dimethyl phthalate, diethyl phthalate, dibutyl phthalate, diethyl tartrate, dibutyl tartrate, triphenyl phosphate, etc. The plastic composition may also contain pigments, dyes, effect materials, stabilizers such as urea, and any other desired ingredients.

As stated, in order to prevent the exudation of the plasticizers from the plastic composition, we incorporate therein a relatively small proportion of a suitable resin, which may be a natural resin but which is preferably a synthetic resin. Examples of such synthetic resins are benzene-, xylene- or toluene-sulfonamid-formaldehyde resins, phenol formaldehyde resins, cresol-formaldehyde resins, diphenylol propane formaldehyde resins, phthalic anhydride-glycerol resins, etc. These synthetic resins are preferably of the fusible and soluble type of medium hardness.

The amount of synthetic resin incorporated in the plastic composition may vary from 4 to 20%, preferably 10 to 15% of the weight of the plasticizer present therein. This will generally correspond to 2 to 10% of the weight of the cellulose acetate present in the plastic composition. In those cases where the resin tends to impart undue brittleness to the plastic composition, the proportion of plasticizer may be increased.

The plastic composition may be made in any suitable manner such as by incorporating volatile solvents with the solid ingredients and working the same on malaxating rolls in known manner. If desired, solutions of the ingredients in volatile solvents may be cast on smooth surfaces to form films. In another form, the solid ingredients may be intimately mixed and ground to form a dry powder which may be molded under heat and pressure.

The plastic composition may be used for making films for photographic, cinematographic or other purposes, sheets, rods, tubes and finished articles of any desired shape. An important application of this invention is in making lamp shade material.

Besides preventing exudation of the plasticizer, the addition of these synthetic resins imparts other beneficial qualities to the plastic composition. For instance, a harder material is obtained and the surfaces are not so easily scratched. Molded articles made of the plastic composition containing the synthetic resin (especially when the resin is of a reactive type, such as phenol-formaldehyde) may be discharged while still hot from the molds, whereas molded products made of the same composition but not containing the resin must be cooled to almost room temperature before they can be discharged from the molds, due to the thermoplastic character of the material. Sheets made according to this invention are also more readily cementable with the usual liquid cements and have greater adhesive properties. We have also obtained very satisfactory results when employing these synthetic resins in cellulose acetate dopes or solutions that are applied to fabrics or goggle tubing, since the exudation of plasticizers previously experienced is overcome.

In order further to illustrate this invention, but without being limited thereto, the following specific example is given.

Example

The following is a specific example of the composition of the solid ingredients of a plastic material that may be made in accordance with this invention.

| | Parts by weight |
|---|---|
| Cellulose acetate | 100 |
| Triphenyl phosphate | 15 |
| Para-ethyl-toluene sulfonamid | 30 |
| Toluene sulfonamid-formaldehyde resin | 5 |

The toluene sulfonamid-formaldehyde resin is a medium hard condensation product made by reacting toluene sulfonamids with formaldehyde.

It is to be understood that the foregoing description is given merely by way of illustration and that many variations may be made therein without departing from the spirit of our invention.

Having described our invention, what we desire to secure by Letters Patent is:

1. In a process of producing plastic compositions and articles therefrom which comprise organic derivatives of cellulose and plasticizer in amounts which would normally exude, the step which comprises incorporating therein a synthetic resin in amounts of 4 to 20% of the plasticizer therein.

2. In a process of producing plastic compositions and articles therefrom which comprise organic derivatives of cellulose and plasticizer in amounts which would normally exude, the step which comprises incorporating therein a toluene sulfonamide-formaldehyde resin in amounts of 4 to 20% of the plasticizer therein.

3. In a process of producing plastic compositions and articles therefrom which comprise cellulose acetate and plasticizer in amounts which would normally exude, the step which comprises incorporating therein a synthetic resin in amounts of 4 to 20% of the plasticizer therein.

4. In a process of producing plastic compositions and articles therefrom which comprise cellulose acetate and plasticizer in amounts which normally exude, the step which comprises incorporating therein a toluene sulfonamide-formaldehyde resin in amounts of 4 to 20% of the plasticizer therein.

5. A plastic composition containing cellulose acetate and plasticizer in amounts which would normally exude and a synthetic resin in amounts of 4 to 20% of the weight of the plasticizer present to diminish the tendency of the plasticizer to exude.

6. A plastic composition containing cellulose acetate and plasticizer in amounts which would normally exude and a toluene sulfonamide-formaldehyde resin in amounts of 4 to 20% of the weight of the plasticizer present to diminish the tendency of the plasticizer to exude.

JAMES F. WALSH.
AMERIGO F. CAPRIO.